US011244684B2

(12) United States Patent
Malpani (10) Patent No.: US 11,244,684 B2
(45) Date of Patent: Feb. 8, 2022

(54) COMMUNICATION AGENT TO CONDUCT A COMMUNICATION SESSION WITH A USER AND GENERATE ORGANIZATIONAL ANALYTICS

(71) Applicant: International Business Machines Corporation, Armonk, NY (US)

(72) Inventor: Ravi Malpani, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/127,346

(22) Filed: Sep. 11, 2018

(65) Prior Publication Data

US 2020/0082828 A1 Mar. 12, 2020

(51) Int. Cl.
*G10L 15/22* (2006.01)
*G10L 15/26* (2006.01)
*G06Q 10/06* (2012.01)
*G06Q 10/10* (2012.01)
*G10L 15/18* (2013.01)
*G10L 25/63* (2013.01)

(52) U.S. Cl.
CPC ........ *G10L 15/26* (2013.01); *G06Q 10/06398* (2013.01); *G06Q 10/063114* (2013.01); *G06Q 10/105* (2013.01); *G10L 15/22* (2013.01); *G10L 15/18* (2013.01); *G10L 15/222* (2013.01); *G10L 25/63* (2013.01); *G10L 2015/225* (2013.01)

(58) Field of Classification Search
None
See application file for complete search history.

(56) References Cited

U.S. PATENT DOCUMENTS

| 8,160,979 | B1 | | 4/2012 | Evans et al. | |
|---|---|---|---|---|---|
| 9,648,167 | B2 | * | 5/2017 | Riahi | H04M 3/4936 |
| 9,953,650 | B1 | * | 4/2018 | Falevsky | G06F 3/011 |
| 10,310,717 | B2 | * | 6/2019 | Spear | G06F 11/0751 |
| 2003/0154072 | A1 | * | 8/2003 | Young | G06F 16/40 704/9 |
| 2003/0167167 | A1 | * | 9/2003 | Gong | G10L 15/22 704/250 |

(Continued)

OTHER PUBLICATIONS

"The Future of Human Resource", Market Insights, Innovations, Bots for Personnel Function, Issue 03, 2017, pp. 40-42.

*Primary Examiner* — Richard Z Zhu
(74) *Attorney, Agent, or Firm* — John Noh; Edell, Shapiro & Finnan, LLC (57) ABSTRACT

A computer system conducts a communication session using a communication agent. Organizational information relating to a user is received. A communication session is conducted between a user and a communication agent, wherein the communication agent discusses one or more topics of an organization of the user. Organizational analytics are generated by applying natural language processing to user feedback to identify user issues pertaining to the one or more organizational topics wherein the organizational analytics are based on user sentiment toward the one or more organizational topics. The organizational analytics are reported to a third party. Embodiments of the present invention further include a method and program product for conducting a communication session using a communication agent in substantially the same manner described above.

12 Claims, 4 Drawing Sheets

(56) References Cited

U.S. PATENT DOCUMENTS

| | | | |
|---|---|---|---|
| 2008/0215365 A1* | 9/2008 | Croan | G06F 19/3418 |
| | | | 705/2 |
| 2011/0010173 A1* | 1/2011 | Scott | H04M 3/42221 |
| | | | 704/235 |
| 2014/0220526 A1* | 8/2014 | Sylves | G06Q 30/0201 |
| | | | 434/238 |
| 2015/0302303 A1 | 10/2015 | Hakim | |
| 2015/0346963 A1* | 12/2015 | Spear | G06F 11/0751 |
| | | | 715/733 |
| 2015/0371172 A1 | 12/2015 | Minter | |
| 2016/0042749 A1* | 2/2016 | Hirose | G10L 15/22 |
| | | | 704/270.1 |
| 2016/0342317 A1* | 11/2016 | Lim | G10L 15/22 |
| 2017/0221001 A1* | 8/2017 | Chandrasekaran | G06Q 10/105 |
| 2018/0365618 A1* | 12/2018 | Hardy | G06F 16/2423 |
| 2018/0365619 A1* | 12/2018 | Hardy | G06Q 10/06393 |
| 2019/0043511 A1* | 2/2019 | Zhang | B25J 9/0003 |
| 2019/0108834 A1* | 4/2019 | Nelson | G06Q 10/10 |
| 2019/0287517 A1* | 9/2019 | Green | G10L 15/08 |

\* cited by examiner

COMMUNICATION AGENT TO CONDUCT A COMMUNICATION SESSION WITH A USER AND GENERATE ORGANIZATIONAL ANALYTICS

BACKGROUND

1. Technical Field

Present invention embodiments relate to communication systems, and more specifically, to conducting communications sessions with a user via a communication agent to generate organizational analytics.

2. Discussion of the Related Art

A communication agent, also known as a chatbot, refers to a computer application capable of conversing with human users. Communication agents are increasingly used in applications that were typically performed by human assistants, such as providing information to users, carrying out particular tasks, or performing other operations as required. A communication agent may use natural language processing techniques in order to conduct conversations relating to a variety of topics without requiring the communication agent to be specifically scripted for each topic. However, functionality of the communication agents are becoming limited with respect to the increasing complexity of the structure and operations of organizations.

SUMMARY

According to one embodiment of the present invention, a computer system conducts a communication session using a communication agent. Organizational information relating to a user is received. A communication session is conducted between a user and a communication agent, wherein the communication agent discusses one or more topics of an organization of the user. Organizational analytics are generated by applying natural language processing to user feedback to identify user issues pertaining to the one or more organizational topics wherein the organizational analytics are based on user sentiment toward the one or more organizational topics. The organizational analytics are reported to a third party. Embodiments of the present invention further include a method and program product for conducting a communication session using a communication agent in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to communication systems, and more specifically, to conducting communications sessions with a user via a communication agent to generate organizational analytics. An organization can employ one or more communication agents to perform a variety of human resource operations, such as ensuring that members of the organization meet their goals, responding to concerns that the members voice during a conversation, analyzing data generated during conversations to produce analytics, and reporting information to organizational leaders. In general, periodic conversations between a member of an organization and a communication agent may be scheduled, and the organization member's responses can be analyzed to generate various analytics regarding the member's performance, expectations, and concerns. These metrics can then be shared with a leader in the organization, who can use the analytics in making organizational decisions.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
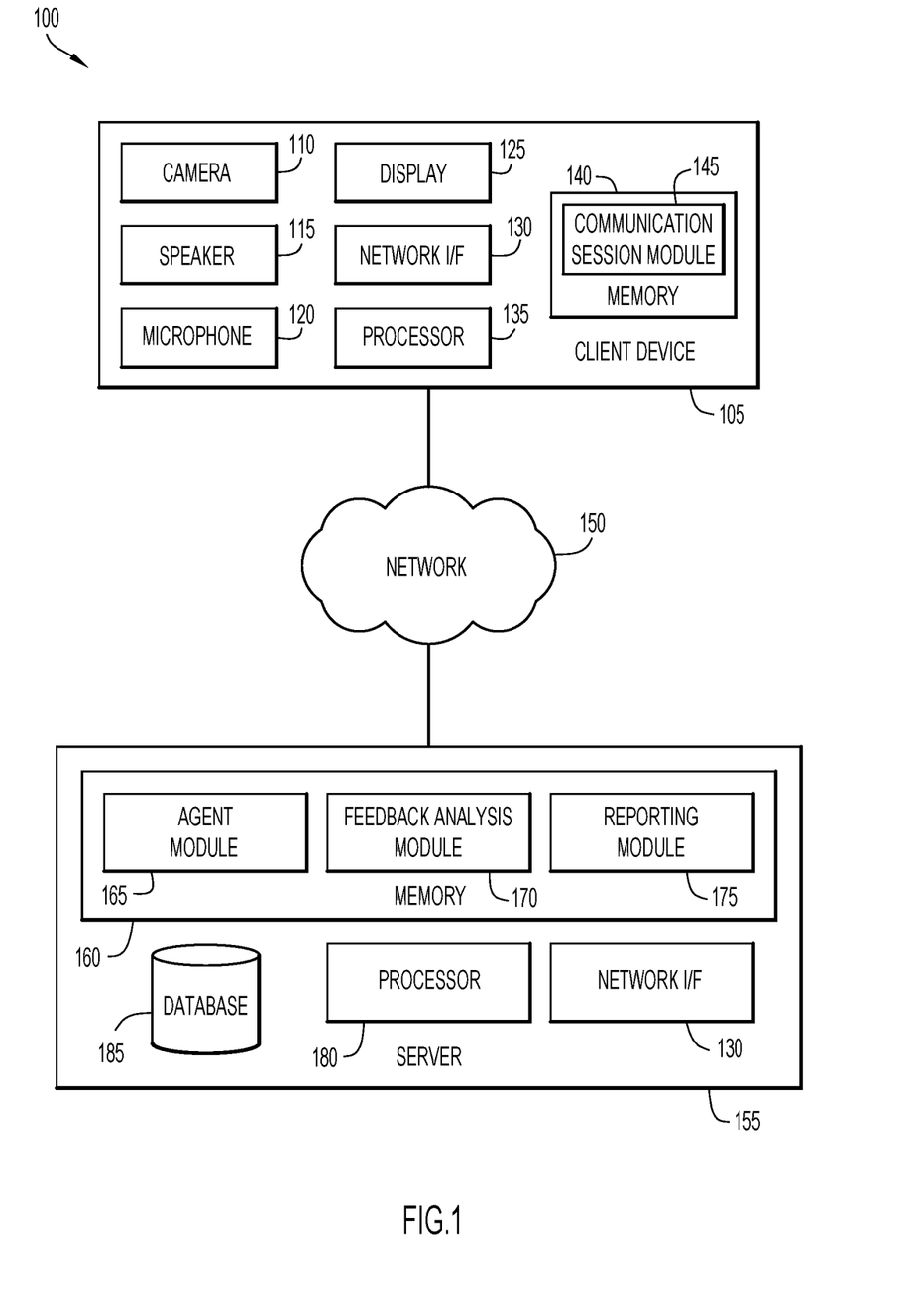
FIG. 1 is a block diagram depicting a computing environment for processing user responses in accordance with an embodiment of the present invention.

Present invention embodiments will now be described in detail with reference to the Figures. FIG. 1 is a block diagram depicting a computing environment 100 for processing user responses in accordance with an embodiment of the present invention. As depicted, computing environment 100 includes a client device 105, a network 150, and a server 155. It is to be understood that the functional division among components of computing environment 100 have been chosen for purposes of explaining the present invention and is not to be construed as a limiting example.

Client device 105 includes a camera 110, a speaker 115, a microphone 120, a display 125, a network interface 130, a processor 135, and memory 140 with communication session module 145. In various embodiments of the present invention, client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Client device 105 may include internal and external hardware components, as depicted and described in further detail with respect to FIG. 4.

Camera 110 may be any conventional or other image capture device capable of still photography and/or videography. Speaker 115 may include any transducer capable of converting an electrical signal to sound, and microphone 120 may include any transducer capable of converting sound to an electrical signal. Display 125 may include any output device for presenting information in a visual form, such as a liquid crystal display (LCD), a cathode ray tube (CRT) display, or a light-emitting diode (LED) display. A user of client device 105 may conduct conversations with a communication agent using speaker 115 and microphone 120. Additionally or alternatively, a user of client device 105 may provide input to client device 105 via an input device such as a keyboard. In some embodiments, an avatar of a communication agent is displayed on display 125.

Communication session module 145 may include one or more modules or units to perform various functions of present invention embodiments described below. Communication session module 145 may be implemented by any combination of any quantity of software and/or hardware modules or units, and may reside within memory 140 of client device 105 for execution by a processor, such as processor 135.

Communication session module 145 may include a telecommunications client that enables a user to participate in a conversation with a communication agent. For example, a user may converse with a communication agent using natural speech, by inputting text, or by using speech-to-text conversion to facilitate a dialogue with a communication agent. Thus, communication session module 145 may support communications in one or more media forms, including text, images, audio, and/or video. Communication session module 145 may connect with agent module 165 of server 155 in order to facilitate a conversation between a user and a communication agent. Communication session module 145 may provide a communication agent that discusses one or more organizational topics with a user, such as the user's performance and expectations within an organization, any issues that a user is facing regarding an organization, and the like.

Network 150 may include a local area network (LAN), a wide area network (WAN) such as the Internet, or a combination of the two, and includes wired, wireless, or fiber optic connections. In general, network 150 can be any combination of connections and protocols that will support communications between client device 105 and server 155 via their respective network interfaces 130 in accordance with embodiments of the present invention.

Server 155 includes a network interface 130, memory 160, at least one processor 180, and a database 185. In general, server 155 and its modules provide a communication agent to communicate with users, and based on these communications, generate useful analytics for an organization. Client device 105 may share data with server 155 and its modules, including any data gathered from camera 110 and microphone 120. Server 155 may include internal and external hardware components, as depicted and described in further detail with respect to FIG. 4.

Memory 160 includes agent module 165, feedback analysis module 170, and reporting module 175. Agent module 165, feedback analysis module 170, and reporting module 175 may include one or more modules or units to perform various functions of present invention embodiments described below. Agent module 165, feedback analysis module 170, and reporting module 175 may be implemented by any combination of any quantity of software and/or hardware modules or units, and may reside within memory 160 of server 155 for execution by a processor, such as processor 180.

Agent module 165 may control one or more communication agents that is capable of conversing with human users of client device 105. Agent module 165 may use conventional or other natural language processing techniques in order to participate in a conversation with a user. In some embodiments, agent module 165 renders an avatar that provides a visual component to a conversation by simulating speech, facial expressions, and the like. The avatar may be displayed on display 125 of client device 105. Agent module 165 may direct a communication agent to pose particular questions to a user, and based on the user's responses, pose further questions and/or provide statements that are relevant to any speech contributed by the user. Agent module 165 may be provided with information relating to an organization, such as business goals and deadlines, process information, business unit information, and other employment information. Agent module 165 may also be provided with information relating to a user, such as the user's progress toward organizational goals, the user's productivity, and other metrics relating to a user. Agent module 165 may then share information with a user via a communication agent in a communication session. Thus, when a user interacts with a communication agent, the user may be informed of important information relating to an organization, such as financial information, organizational updates and changes, progression of organization goals, and the like.

Feedback analysis module 170 may analyze user feedback that is collected when a user converses with a communication agent to generate analytics relating to a user. Feedback analysis module 170 may operate in conjunction with agent module 165 in order to continuously refine the questions posed and/or information presented by a communication agent as a user contributes to the conversation. Feedback analysis module 170 may use tone analysis to determine one or more tones associated with a user's feedback on a given topic, such as frustration, satisfaction, excitement, politeness, impoliteness, sadness, sympathy, and the like.

Feedback analysis module 170 may also identify any issues that a user is facing. For example, if a user has failed to meet a particular productivity goal for the last quarter, agent module 165 may have a communication agent ask the user to discuss the user's failure to meet the goal. Based on the user's feedback, feedback analysis module 170 may then identify reasons why the user did not meet a goal, such as a deadline being missed due to a delay, the volume of work expected being unreasonable, a task being overly complicated, and the like. When feedback analysis module 170 identifies questions that a user has asked, feedback analysis module 170 may identify answers to the questions, which may be presented to the user via a communication agent. Similarly, when feedback analysis module 170 identifies issues that a user is facing, feedback analysis module 170 may identify solutions to the issues, which can be presented to the user using the communication agent. In some embodiments, feedback analysis module 170 classifies issues experienced by a user according to the degree of severity of the issue.

Reporting module 175 may report the results of feedback analysis module 170 to a relevant entity, such as an organizational manager. In some embodiments, reporting module 175 delivers information to an entity by using agent module 165 to provide a communication agent that reports the results to the entity during a communication session. Additionally or alternatively, reporting module 175 may deliver the results of feedback analysis module 170 in the form of a report that can be read by an entity. Reporting module 175 may select the entity to which results of feedback analysis module 170 are reported based on the severity of identified issues. For example, if there are no issues identified, or the issues that are identified are classified as low-severity issues, then reporting module 175 may select a user's immediate manager as the entity to which reporting module 175 reports. If an issue is classified as a high-severity issue, however, reporting module 175 may escalate its reporting to an entity that is higher in an organization, such as a department supervisor or an executive.

Agent module 165, feedback analysis module 170, and/or reporting module 175 may use conventional or other cognitive or artificial intelligence techniques in order to conduct a communication session, analyze a user's responses to identify and resolve issues, and generate reports. In some embodiments, artificial intelligence techniques may include approaches using a theory of mind paradigm, self-aware artificial intelligence, and the like. The artificial intelligence techniques used herein may enable a communication agent to identify feelings, emotions, intentions, and expectations of a user, with whom the communication agent may interact socially. Furthermore, present invention embodiments may utilize conventional or other artificial intelligence techniques in order to predict feelings and sentiments of users.

Database 185 may include any non-volatile storage media known in the art. For example, database 185 can be implemented with a tape library, optical library, one or more independent hard disk drives, or multiple hard disk drives in a redundant array of independent disks (RAID). Similarly, data on database 185 may conform to any suitable storage architecture known in the art, such as a file, a relational database, an object-oriented database, and/or one or more tables. Database 185 may include any data associated with a user, such as general organizational information, organizational information that is specific to a user, user feedback information, and the like.

Figure 2:
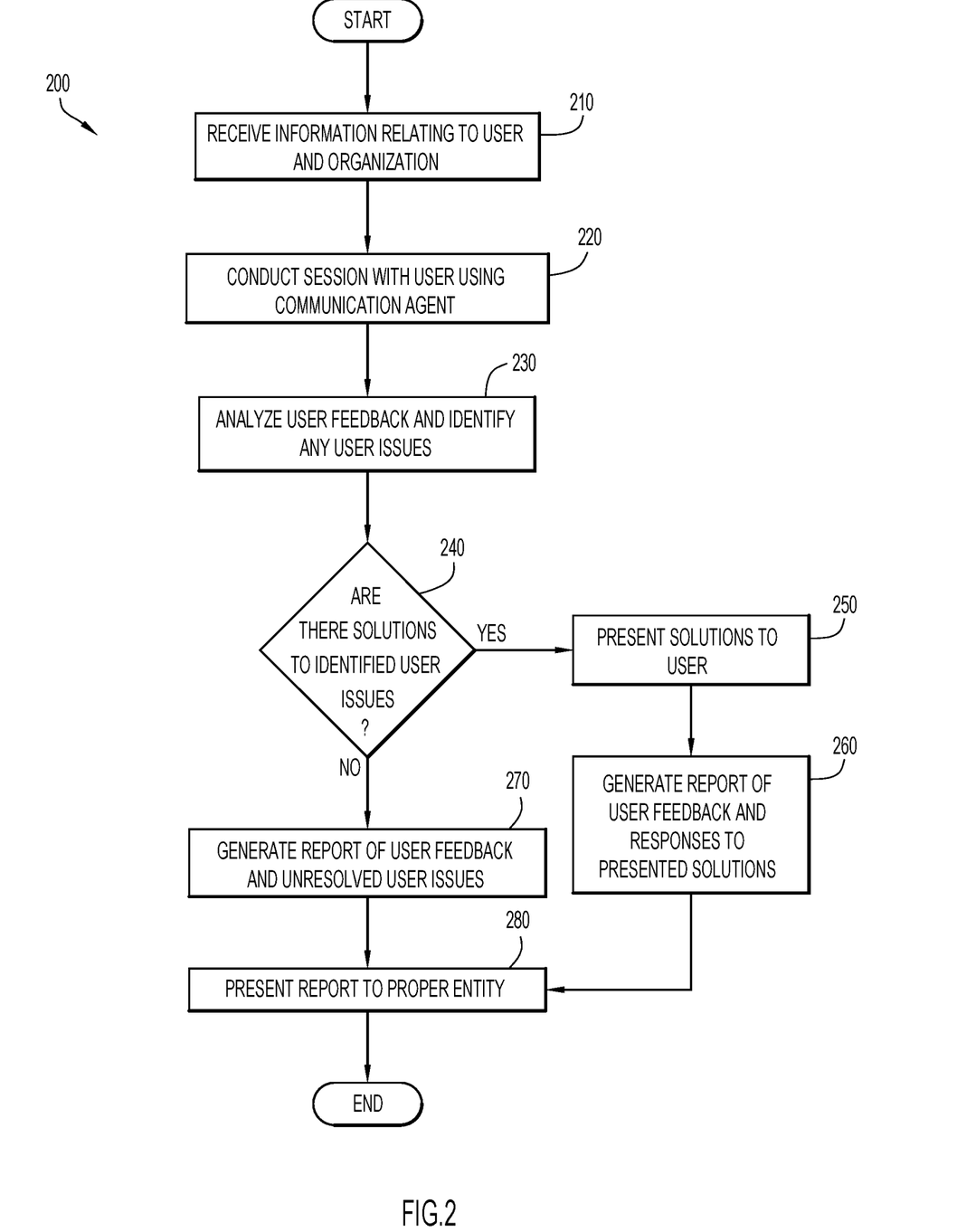
FIG. 2 is a flow chart depicting a method of processing user responses in accordance with an embodiment of the present invention.

FIG. 2 is a flow chart depicting a method 200 of processing user response in accordance with an embodiment of the present invention.

Information relating to a user and an organization is received at operation 210. The information may include organization information, process information, business unit information, human resource information, salary information, team meeting information, and any other information relating to an organization, such as its structure, finances, goals, deadlines, day-to-day operations, recurring events, and the like. In some embodiments, information is received from an entity, such as a manager, relating to monthly team meetings and any team updates. Other information that can be collected may include information about a team conducting a meeting, round table discussion, or review, such as a project name, manager name, location, and the like, and any information detailing relationships between any entity at any level of organization, such as a member's supervisor, the project or department to which a member belongs, a member's office location, and the like. Information may be collected by processing data relating to an organization, such as data in database 185.

A communication session is conducted between a user and a communication agent at operation 220. In some embodiments, the communication session is initiated in response to a request by a manager within an organization. Agent module 165 may provide a communication agent that is capable of participating in a conversation using conventional or other natural language processing techniques. The communication agent may present information to a user, including information collected at operation 210, and may pose one or more questions to the user. Thus, communication agent may guide a conversation with a user in order to discuss one or more organizational topics. For example, a communication agent may ask a user to describe the user's experiences with meeting organization goals. The communication agent may ask a user to discuss any discrepancies between the user's actual performance in the organization and the potential or desired performance of the user. For example, if a user is underperforming or overperforming in a particular task or expectation, the communication agent may encourage the user to provide details regarding the user's underperformance or overperformance. In some embodiments, a user can specify whether the user would like to remain anonymous with regard to some or all of the user's conversation with the communication agent.

User feedback is analyzed and any user issues are identified at operation 230. Feedback analysis module 170 may analyze a user's feedback during a communication session to identify the user's expectations in regard to the user's position in an organization, as well as any particular issues that a user is experiencing at the organization. User feedback may be processed according to conventional or other natural language processing techniques, and the user's tone and sentiments toward subjects may be identified. For example, feedback analysis module 170 may determine whether a user is enthusiastic toward their role in an organization, if the user is facing any particular issues such as interpersonal conflicts with other members of the organization, whether a user has any particular grievances toward aspects of an organization, and the like. A user's productivity within an organization may also be analyzed. For example, feedback analysis module 170 may determine that a user is overperforming or underperforming in particular tasks, and may determine reasons for the overperformance or underperformance. User feedback may include a user's speech, text input, and non-verbal actions and communications, such as body language of the user, that can be captured by camera 110 during a communication session.

Feedback analysis module 170 may analyze a user's feedback in conjunction with the provided information relating to the user to determine if a user is an eligible candidate for programs or awards within the organization, such as pilot programs, bonuses, salary adjustments, and the like. Feedback analysis module 170 may use data mining and other analytic techniques to identify a user's performance and contributions within an organization, and to identify areas of improvement for the user. Furthermore, feedback from multiple users may be analyzed to identify trends within an organization and to compare users to each other.

Operation 240 determines whether there are solutions to the identified user issues. When a user issue is identified, it may be placed into one or more categories for which known solutions exist. Solutions to issues may be identified based on previous communication sessions between a communication agent and other users. Presented solution may be evaluated in later communication sessions to determine the efficacy of each presented solutions, and any solutions that prove effective may be stored in a repository, such as database 185, so that they may be used to resolve similar or identical issues in the future. If a solution exists for the identified issue, method 200 proceeds to operation 250. If no solution can be found for an identified issue, method 200 proceeds to operation 270.

Solutions are presented to the user at operation 250. The solutions may be communicated to the user by a communication agent. As the solutions to the user's issues are presented, the user's reactions may be captured (e.g., by camera 110 and/or microphone 120) for further analysis by feedback analysis module 170.

A report containing analytics produced by analyzing user feedback as well as the user's responses to presented solutions is generated at operation 260. Reporting module 175 may generate a report that outlines the user's performance in the organization, the user's expectations of the organization with regard to tasks assigned to the user, and any suggestions or recommendations for a team leader or business unit manager within the organization to follow when managing the user. For example, if feedback analysis module 170 determines that a user prefers a particular management style, then reporting module 170 may include in the report suggestions relating to that management style. The report may also include future issues that can be predicted by analyzing collected data. Predicted issues may include reasons for member satisfaction or dissatisfaction, reasons for low or high productivity, challenges related to a particular business unit, other predicted events, and any factors that may cause predicted events. In some embodiments, reporting module 170 may indicate the degree to which any proposed solutions to identified user issues are likely to be successful.

A report that contains the results of analyzing user feedback and that identifies any unresolved user issues is generated at operation 270. Unresolved user issues may include any identified issues for which a solution was not found. The report may include other information related to the unresolved issues, such as the severity of the issue. For example, a communication agent may ask a user to estimate or rank the user's perceived importance of the issue with regard to the user's membership in the organization.

The report is presented to a proper entity at operation 280. Reporting module 170 may select one or more entities to whom the report should be presented. For example, if the report identifies any issues whose severity surpasses a predetermined threshold, reporting module 170 may escalate the report to a business unit manager or executive rather than the user's immediate supervisor. In some embodiments, various aspects of the report may be presented to different entities according to the aspects of the user being analyzed and the hierarchical level of the entity within the organization. For example, a user's daily, monthly, or quarterly productivity metrics may be submitted to an immediate supervisor, whereas the user's yearly productivity metrics may be submitted to a business unit manager. Method 200 may be repeated over a selected time period, such as weekly, monthly, quarterly, or yearly, in order to ensure that members of an organization are evaluated on a regular basis.

Figure 3:
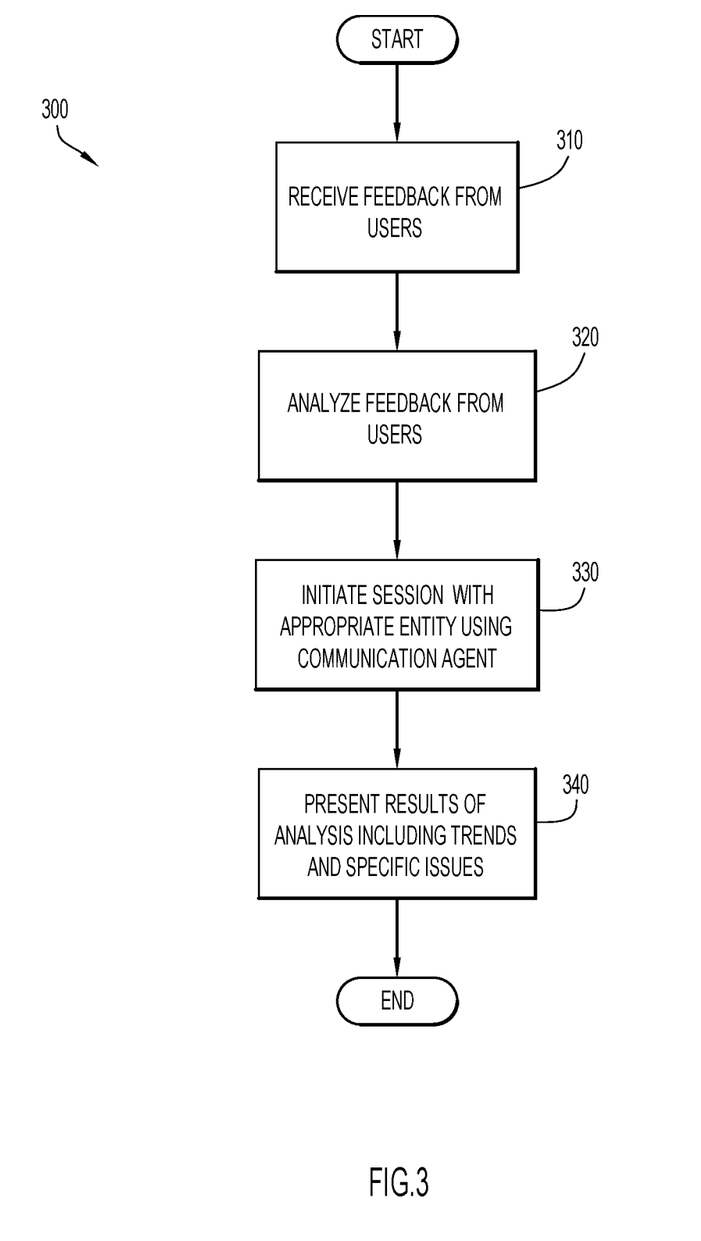
FIG. 3 is a flow chart depicting a method of presenting results of processing user responses in accordance with an embodiment of the present invention.

FIG. 3 is a flow chart depicting a method 300 of presenting results of processing user responses in accordance with an embodiment of the present invention.

Feedback is received from one or more users at operation 310. The feedback may be collected from communications sessions between a communication agent and one or more users. In some embodiments, multiple users may collectively conduct a communication session with a communication agent. In other embodiments, feedback may be collected from multiple sessions that are each conducted between a single user and the communication agent.

User feedback is analyzed at operation 320. User feedback may be analyzed by feedback analysis module 170, which identifies user issues and user expectations, provides user performance metrics, and highlights any trends that are identified by comparing the feedback of multiple users. User feedback may be analyzed across an entire organization, or by portions of an organization, such as on a team basis or business unit basis. By analyzing the feedback A communication session is initiated between a communication agent and one or more appropriate entities at operation 330. The entity or entities that are selected for the communication session may be determined by reporting module 175 according to the results of analyzing user feedback. For example, if a user discussed certain topics or presented issues that are within the sphere of operations of a particular manager at an organization, that manager may be selected. For issues that are identified as particularly severe, reporting module 175 may select an entity corresponding to a higher hierarchical level within an organization, such as a business unit manager or executive.

A report containing analytics resulting from the analysis of user feedback is presented at operation 340. A communication agent may discuss the report with an appropriate entity using conventional or other natural language processing techniques. For example, the communication agent may disclose trends within an organization, the general sentiments of users toward particular areas of the organization, reasons for any gaps between users' actual performance and their desired or potential performance, and the like. Different reports may be given to different entities within the organization based on the nature and/or severity of issues that are identified during a communication session.

During the communication session, a communication agent may coach and guide managers by delineating one or more areas in which an organization may be improved. For example, the communication agent may provide a manager with an appropriate solution to an issue based on available data, such as solutions that have a history of success at remedying identical or similar issues. Alternatively or additionally, the results of analyzing user feedback may be sent to one or more entities without conducting a communication session. For example, reporting module 175 may transmit a report to entities via email or a proprietary electronic notification system. The report may indicate a ranking of users according to various metrics, and may indicate whether any members in an organization should receive special treatment, such as awards, additional training, and the like. Furthermore, a high-ranking entity may be able to access any reports sent to intermediate entities; for example, a second-level supervisor may access reports sent to a first-level supervisor regarding a particular member of an organization, and the like. Thus, a second-level supervisor can be informed of which actions have already been taken in addressing an unresolved issue.

Figure 4:
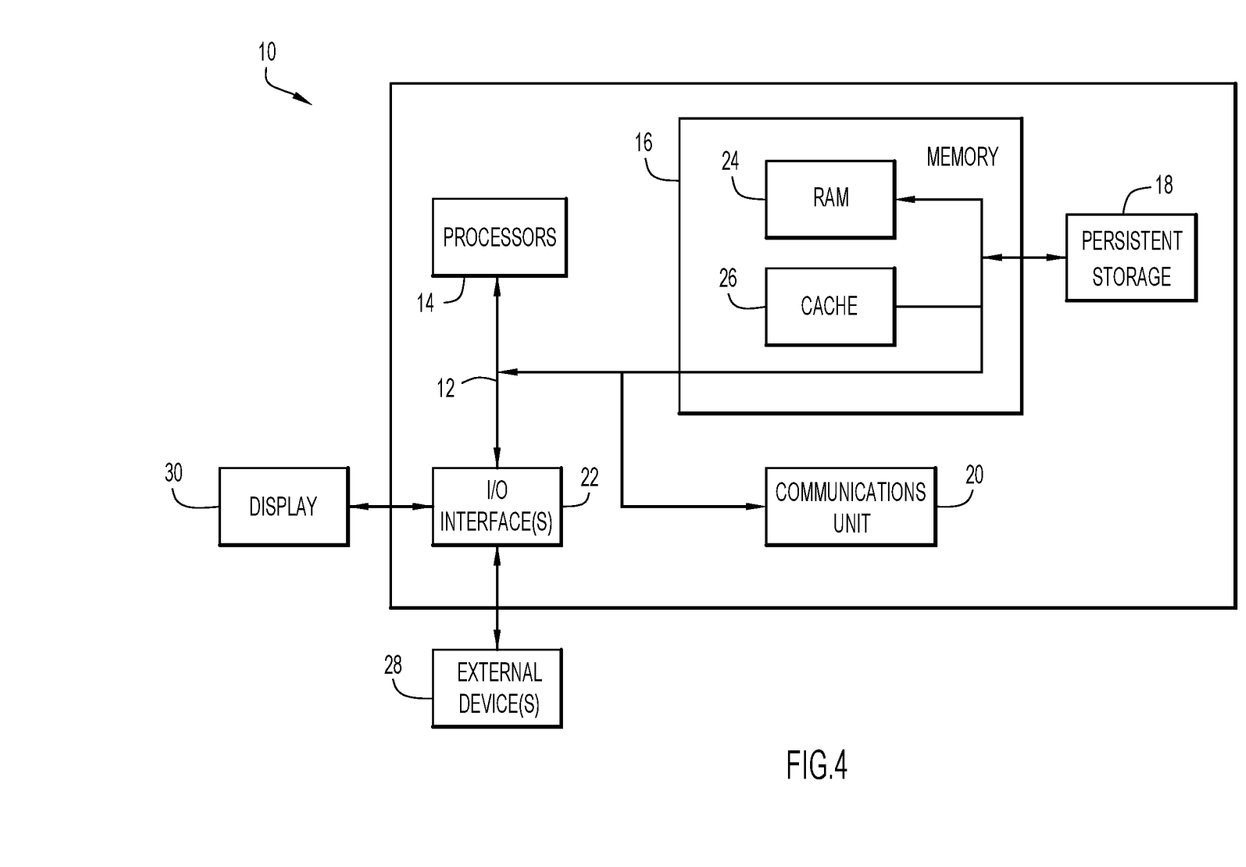
FIG. 4 is a block diagram depicting a computing device in accordance with an embodiment of the present invention.

FIG. 4 is a block diagram depicting components of a computer 10 suitable for executing the methods disclosed herein. Computer 10 may implement client device 105 and server 155 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to an organization (e.g., user feedback information, user issue information, analytics relating to users in an organization, etc.) may be stored within any conventional or other data structures (e.g., files, arrays, lists, stacks, queues, records, etc.) and may be stored in any desired storage unit (e.g., database, data or other repositories, queue, etc.) The data transmitted between client device 105 and server 155 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to an organization (e.g., user feedback information, user issue information, analytics relating to users in an organization, etc.) may include any information provided to, or generated by, client device 105 and server 155. Data relating to an organization may include any desired format and arrangement, and may include any quantity of any types of fields of any size to store any desired data. The data relating an organization may include any data collected about entities by any collection means, any combination of collected information, and any information derived from analyzing collected information.

The present invention embodiments may employ any number of any type of user interface (e.g., Graphical User Interface (GUI), command-line, prompt, etc.) for obtaining or providing information (e.g., user feedback information, user issue information, analytics relating to users in an organization, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of generating organizational analytics using a communication agent.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., server software, communications software, communication session module 145, agent module 165, feedback analysis module 170, reporting module 175, etc.). These systems may include any types of monitors and input devices (e.g., keyboard, mouse, voice recognition, etc.) to enter and/or view information.

It is to be understood that the software (e.g., server software, communications software, communication session module 145, agent module 165, feedback analysis module 170, reporting module 175, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., server software, communications software, communication session module 145, agent module 165, feedback analysis module 170, reporting module 175, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to an organization). The database system may be implemented by any number of any conventional or other databases, data stores or storage structures (e.g., files, databases, data structures, data or other repositories, etc.) to store information (e.g., data relating to an organization). The database system may be included within or coupled to the server and/or client systems. The database systems and/or storage structures may be remote from or local to the computer or other processing systems, and may store any desired data (e.g., data relating to an organization).

The present invention embodiments may employ any number of any type of user interface (e.g., Graphical User Interface (GUI), command-line, prompt, etc.) for obtaining or providing information (e.g., data relating to an organization), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of conducting a communication session using a communication agent, comprising:

conducting a communication session between a user and a communication agent, wherein the communication agent comprises a software module that utilizes natural language processing, wherein the communication agent discusses one or more organizational topics of an organization of the user by prompting the user to provide user feedback relating to the one or more organizational topics, the one or more organizational topics including one or more of: a productivity topic, and a deadline topic, and wherein the communication agent provides one or more additional prompts that are selected based on a tone of the user feedback that is determined by applying natural language processing;

generating organizational analytics by applying natural language processing to the user feedback to identify one or more user issues pertaining to the one or more organizational topics, wherein the organizational analytics are based on user sentiment toward the one or more organizational topics;

determining a severity of the one or more identified user issues;

reporting the organizational analytics to a third party, wherein the third party is a member of the organization of the user who is selected based on the severity of the one or more identified user issues; and providing to the user, via the communication agent, one or more solutions to the one or more identified user issues, wherein the one or more solutions relate to the user's performance within the organization with respect to one or more of: the productivity topic, and the deadline topic, and wherein the one or more solutions are based on one or more previous communication sessions conducted between the communication agent and one or more other users.

2. The computer-implemented method of claim 1, wherein the organizational analytics comprise user productivity information.

3. The computer-implemented method of claim 1, wherein reporting the organizational analytics to a third party further comprises conducting a communication session between the third party and the communication agent, wherein the communication agent utilizes natural language processing to discuss the generated organizational analytics with the third party.

4. The computer-implemented method of claim 1, wherein the user issues identified by the organizational analytics include one or more of: a reason that the user was unable to satisfy a productivity goal or a deadline.

5. A computer system for conducting a communication session using a communication agent, the computer system comprising:
one or more computer processors;
one or more computer readable storage media;
program instructions stored on the one or more computer readable storage media for execution by at least one of the one or more computer processors, the program instructions comprising instructions to:
conduct a communication session between a user and a communication agent, wherein the communication agent comprises a software module that utilizes natural language processing, wherein the communication agent discusses one or more organizational topics of an organization of the user by prompting the user to provide user feedback relating to the one or more organizational topics, the one or more organizational topics including one or more of: a productivity topic, and a deadline topic, and wherein the communication agent provides one or more additional prompts that are selected based on a tone of the user feedback that is determined by applying natural language processing;
generate organizational analytics by applying natural language processing to the user feedback to identify one or more user issues pertaining to the one or more organizational topics, wherein the organizational analytics are based on user sentiment toward the one or more organizational topics;
determine a severity of the one or more identified user issues;
report the organizational analytics to a third party, wherein the third party is a member of the organization of the user who is selected based on the severity of the one or more identified user issues; and
provide to the user, via the communication agent, one or more solutions to the one or more identified user issues, wherein the one or more solutions relate to the user's performance within the organization with respect to one or more of: the productivity topic, and the deadline topic, and wherein the one or more solutions are based on one or more previous communication sessions conducted between the communication agent and one or more other users.

6. The computer system of claim 5, wherein the organizational analytics comprise user productivity information.

7. The computer system of claim 5, wherein reporting the organizational analytics to a third party further comprises conducting a communication session between the third party and the communication agent, wherein the communication agent utilizes natural language processing to discuss the generated organizational analytics with the third party.

8. The computer system of claim 5, wherein the user issues identified by the organizational analytics include one or more of: a reason that the user was unable to satisfy a productivity goal or a deadline.

9. A computer program product for conducting a communication session using a communication agent, the computer program product comprising one or more computer readable storage media collectively having program instructions embodied therewith, the program instructions executable by a computer to cause the computer to:
conduct a communication session between a user and a communication agent, wherein the communication agent comprises a software module that utilizes natural language processing, wherein the communication agent discusses one or more organizational topics of an organization of the user by prompting the user to provide user feedback relating to the one or more organizational topics, the one or more organizational topics including one or more of: a productivity topic, and a deadline topic, and wherein the communication agent provides one or more additional prompts that are selected based on a tone of the user feedback that is determined by applying natural language processing;
generate organizational analytics by applying natural language processing to the user feedback to identify one or more user issues pertaining to the one or more organizational topics, wherein the organizational analytics are based on user sentiment toward the one or more organizational topics;
determine a severity of the one or more identified user issues;
report the organizational analytics to a third party, wherein the third party is a member of the organization of the user who is selected based on the severity of the one or more identified user issues; and
provide to the user, via the communication agent, one or more solutions to the one or more identified user issues, wherein the one or more solutions relate to the user's performance within the organization with respect to one or more of: the productivity topic, and the deadline topic, and wherein the one or more solutions are based on one or more previous communication sessions conducted between the communication agent and one or more other users.

10. The computer program product of claim 9, wherein the organizational analytics comprise user productivity information.

11. The computer program product of claim 9, wherein reporting the organizational analytics to a third party further comprises conducting a communication session between the third party and the communication agent, wherein the communication agent utilizes natural language processing to discuss the generated organizational analytics with the third party.

12. The computer program product of claim 9, wherein the user issues identified by the organizational analytics include one or more of: a reason that the user was unable to satisfy a productivity goal or a deadline.

* * * * *